May 10, 1927.  C. PEARSON  1,627,711
LIFTING DEVICE FOR TRACTOR MOWERS
Filed Nov. 15, 1923  3 Sheets-Sheet 3
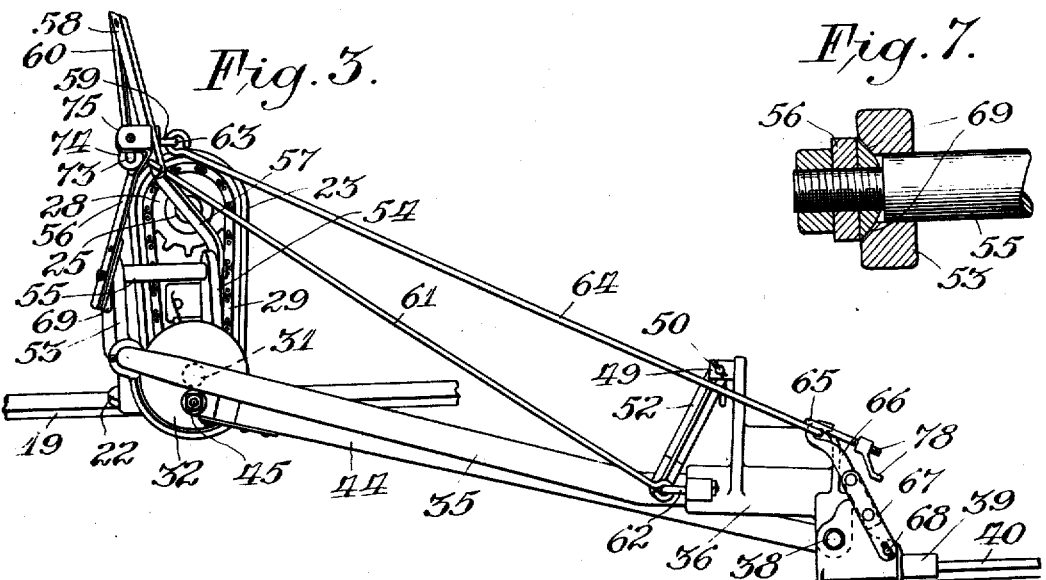
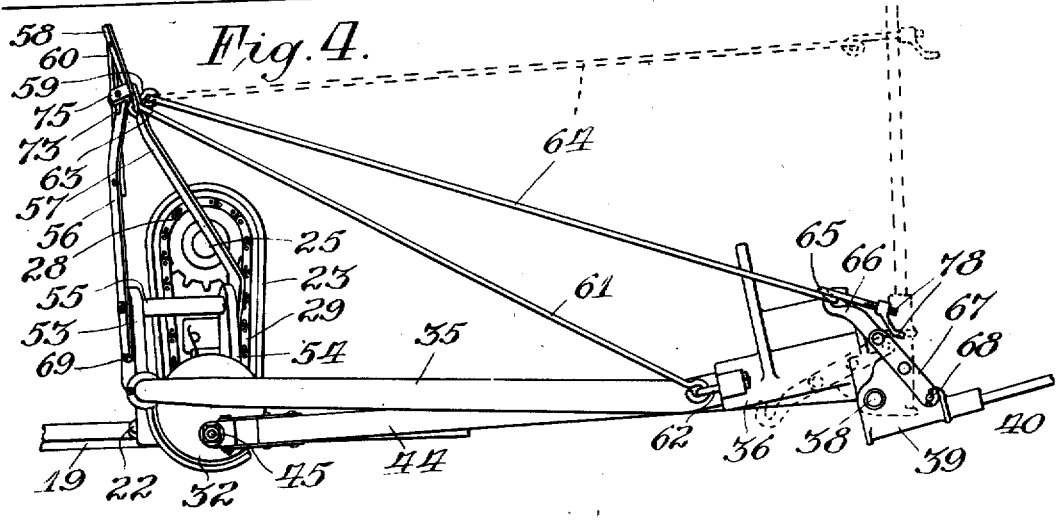
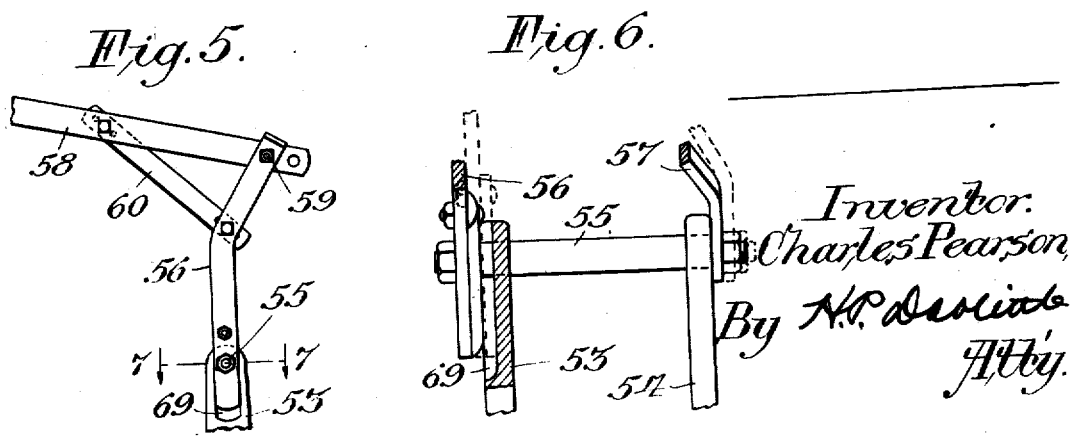

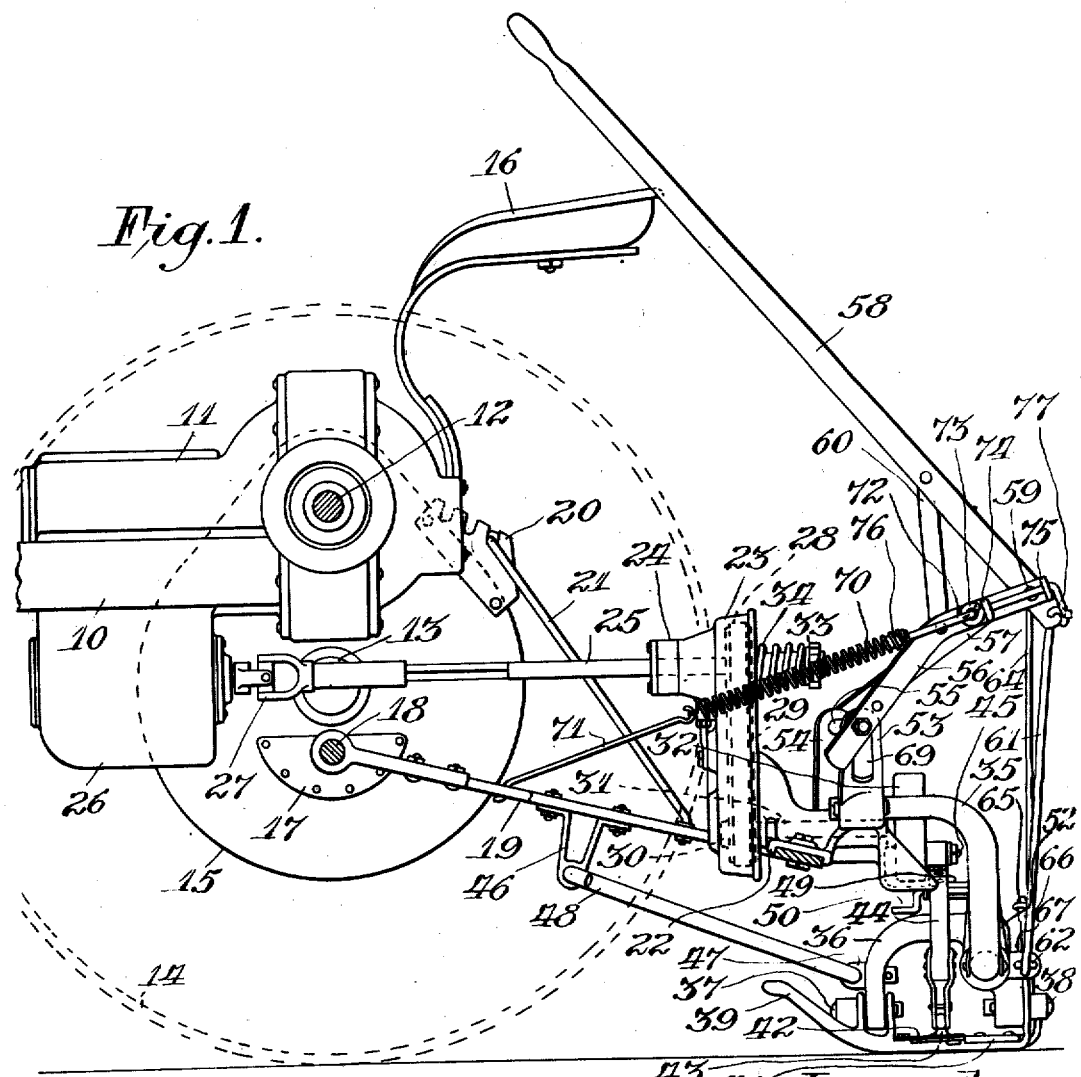

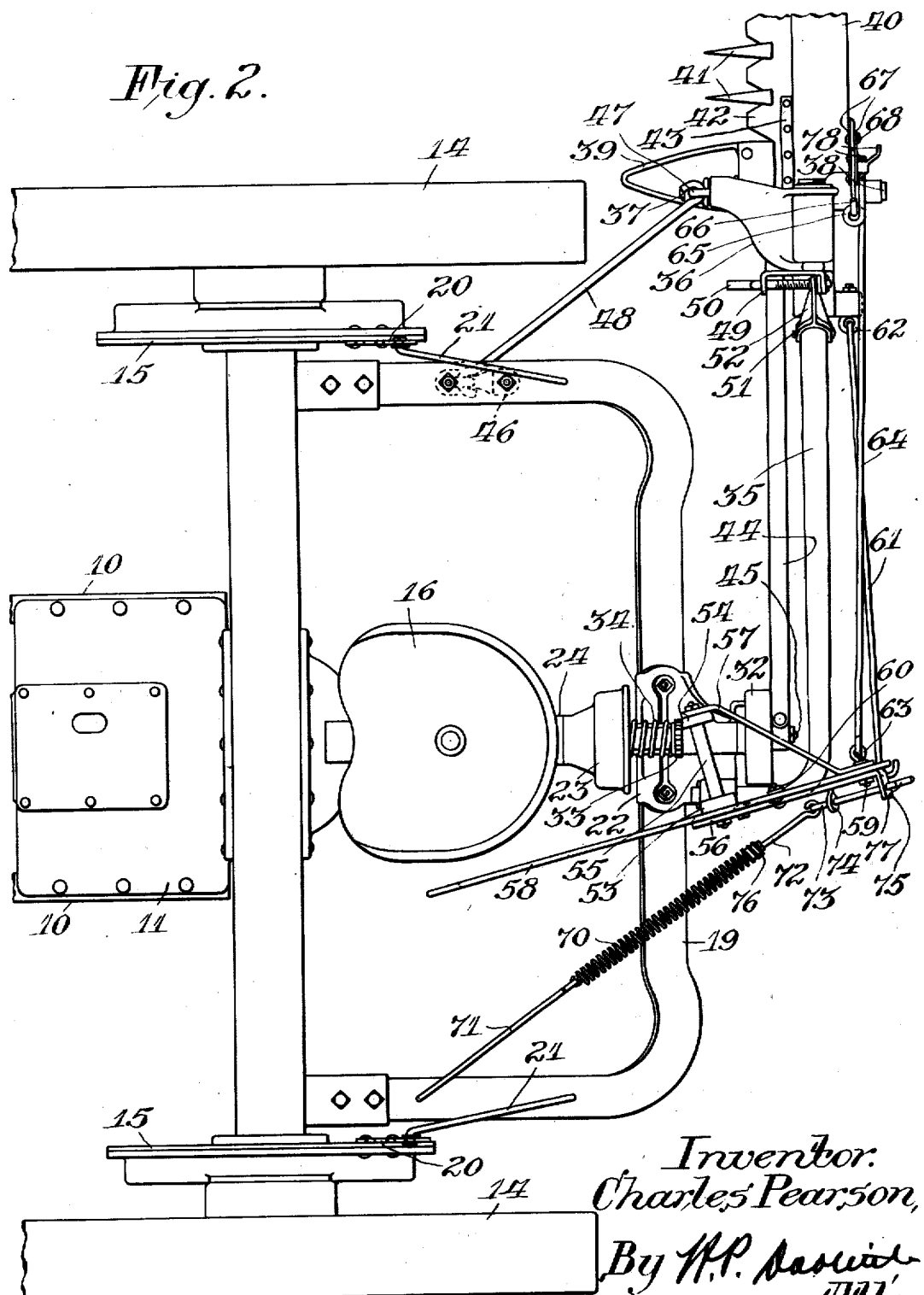

Patented May 10, 1927.

1,627,711

UNITED STATES PATENT OFFICE.

CHARLES PEARSON, OF CHICAGO, ILLINOIS, ASSIGNOR TO INTERNATIONAL HARVESTER COMPANY, OF CHICAGO, ILLINOIS, A CORPORATION OF NEW JERSEY.

LIFTING DEVICE FOR TRACTOR MOWERS.

Application filed November 15, 1923. Serial No. 674,804.

The present invention relates generally to mowing machines and, more particularly, to an improved mechanism for adjusting the cutter bars thereof.

In the operation of mowers having a laterally extending cutter bar it is necessary to provide a number of adjustments therefor; to wit: The bar must be tiltable or rockable to ride over small obstructions in the field and it must also be hinged or pivoted to swing in a vertical plane either to intermediate or plain lift position, to avoid obstructions too large for the tilting mechanism, or to absolute or vertical lift position, to avoid still larger obstructions or for transport purposes.

Obviously, in view of these many adjustments, it is highly desirable that the mechanism for accomplishing these results be simple and effective, so that only a minimum expenditure of physical energy on the part of the operator of the machine is necessary.

Thus, it is an object of this invention to provide in a mower, an improved manually operable means for adjusting the cutter bar.

Another object is to provide an improved lever mechanism for raising the cutter bar to plain lift position, and releasably holding the same in such locked position.

Still another object is to provide a simple lifting mechanism, embodying a pull link, for raising the cutter bar to plain lift position, said link also being adapted to use as a means for supporting the cutter bar in vertical folded or absolute lift position for transport purposes.

These objects and others, which will be apparent to those skilled in the art to which this invention appertains, are accomplished by the mechanism disclosed in the accompanying sheets of drawings, wherein like characters of reference denote similar parts throughout the several views, and wherein:

Fig. 1 is a side elevation of a mower attached to the draft bar of a tractor; the improved adjusting mechanism being shown in position thereon;

Fig. 2 is a plan view of the same structure disclosed in Fig. 1;

Fig. 3 is a rear elevational view showing the adjusting mechanism for the cutter bar, the cutter bar being shown in operative or cutting position;

Fig. 4 is a similar view showing the cutter bar raised to intermediate or plain lift position;

Figs. 5 and 6 are respectively, detailed side and end views of part of the improved lever mechanism for effecting adjustment of the cutter bar; and Fig. 7 is a sectional view taken along the line 7—7 of Fig. 5 and shows, on a somewhat larger scale, the releasable lever locking means.

The tendency in modern farming operations is to rely more and more upon tractors, both for draft purposes and for power operation of attached implements. The invention is accordingly shown embodied in a mower attached to the draft bar of a tractor, the operative parts thereof being driven by means of a suitable power take-off.

Referring now to the accompanying drawings, the improved mower construction is shown in conjunction with a tractor having longitudinally extending frame members 10 supporting a housing 11 which encases the transmission and final or differential drive of the tractor. The differential shaft is shown at 12 and is operatively connected by means, not shown, for imparting rotation to the stub-axles 13, which carry the traction wheels 14. It will be observed that the driving connection between the differential shaft and the stub-axles is housed in casings 15, one of which is disposed adjacent each traction wheel. Attached in any suitable manner to the rear end of the differential casing is a seat 16 for the operator of the tractor, and from which position he may control the mower adjusting mechanism to be described hereinafter.

Each of the casings 15 has bolted thereto beneath the stub-axles 13 a plate 17, each of which carries a pin 18 upon which is rotatably fixed one side member of a U-shaped draft bar 19. The casings 15 also carry at their rear upper sides a notched plate 20, the notches being adapted selectively to engage the angularly bent end of a supporting link 21 bolted at its lower end to the draft bar, as shown. It will thus be seen that this draft bar is capable of adjustment in a vertical plane.

The attachment of the mower to the U-shaped draft bar will next be described.

Positioned by means of bolts and substantially midway between the legs of this draft bar is a base or supporting plate 22 having an integral forwardly extending portion, to which is bolted or fastened in any suitable manner a shield or casing 23, said casing extending in an upward direction. At the upper end of this casing is a forwardly extending portion 24 in which is journaled one end of a propeller or tumbler shaft 25, which is rotated by means of a power take-off suitably geared to the transmission of the tractor and housed within the casing 26. A universal joint 27 is provided so that the driving operation may continue even though the plane of operation between the tractor and attached implement varies. Housed within the shield 23 and loose on the shaft 25 is a sprocket wheel 28, which, by means of a sprocket chain 29 also carried in the casing, drives a second sprocket wheel 30 fixed to a rearwardly extending shaft 31, and which has fixed thereto at its rearmost end a fly wheel 32. A conventional slip-clutch 33 has been provided on the shaft 25 adjacent the loose sprocket wheel 28 and prevents injury to the driven parts. This slip-clutch comprises a friction disk, one on each side of the loose sprocket wheel, held in driving engagement with said wheel by means of a spring 34. By reference to Fig. 1, it will be noted that the casting or base plate 22 has fitted integrally therewith a downwardly and rearwardly extending portion, which serves as a shield for the fly wheel 32.

The base plate 22 is enlarged and apertured at one side to rotatively receive a rearwardly and laterally extending mower coupling frame member 35, which carries at its grassward end a rockable coupling yoke 36 to which is hinged or pivoted, by means of pins 37, 38 the runner shoe 39, which in turn rigidly carries the mower cutter bar 40. The mower cutter bar is provided with conventional guard fingers 41 and knives 42, which are reciprocable there-between by means of the attached knife-head 43 and pitman 44, the opposite end of which is operatively fitted on a wrist-pin 45 eccentrically mounted on the fly wheel 32, heretofore mentioned.

From the above description it should be appreciated that, by means of power transmitted from the tractor through the tumbler shaft 25 and sprocket wheel and chain connections, mentioned above, rotation is imparted to the fly wheel 32 which, in turn, has its motion translated into reciprocatory motion by means of the pitman 44, to reciprocate the knives on the cutter bar.

The grassward side of the U-shaped draft bar carried by the tractor has mounted on its under side and suitably fastened thereto by means of bolts, a depending bracket 46. The coupling yoke 36 on the mower frame carries at its front end an eye member 47, in which is fitted the hooked end of a drag bar, or link, 48, the front end of said drag bar also being hooked for insertion into an eye in the lower end of the bracket 46. The drag bar assures the proper trailing position of the mower with respect to the tractor.

In the construction of mower shown there is disclosed an automatic means entirely independent of the operator for tilting or rocking the cutter bar 40 so that the same will ride over small obstructions without injuring the cutting parts. While this mechanism forms no part of the present invention, it being disclosed and claimed in applicant's copending application, Serial No. 671,868 filed October 31, 1923, yet it will be briefly described.

The coupling yoke 36 at the grassward end of the mower frame is rockable, as heretofore described, and has fixed at its stubbleward side a U-shaped bracket 49, the legs of which have rotatably journaled therein an integral pin and crank handle 50. Fixed by means of a pin 51 to the coupling frame member 35, adjacent the coupling yoke, is an upstanding supporting member 52, which has an aperture in its upper end through which is loosely fitted the pin 50. Thus, if the runner shoe or any of the guard fingers of the cutter bar should strike a small obstruction in the field during operation, the same will rock or tilt upwardly and rearwardly with the yoke 36, the loose connection between the yoke and member 52 permitting such rocking movement. After the obstruction has been passed the cutter bar returns to normal position by gravity.

The improved lever mechanism for adjusting the cutter bar to raised position will next be described.

Integral with the base plate or member 22 fastened to the tractor draft bar is a pair of spaced upstanding arms 53 and 54, the upper ends of which are apertured for reception of a pin 55. This pin is rotatable in these upstanding members and extends slightly through the members to the outer side thereof where each end receives an arm 56 and 57 of a bifurcated or archlike lever construction. These arms 56 and 57 are each angularly bent to the rear and at their upper terminal ends receive another arm 58, the three arms being rigidly bolted together by means of a bolt 59. The arm 58 is also connected to the arm 56 by means of a strap 60. From the construction described it will be appreciated that a very rigid lever construction is provided and which is conveniently located with respect to the operator's seat on the tractor for controlling the adjustment of the cutter bar. The lower end of the arm 58 has fitted therein the hooked end of a link 61, the opposite end of which is hooked into an eye member 62 carried at the rear end and integral with the coupling yoke 36 adjacent the cutter bar.

The bolt 59, which secures together the arms of the lever, has at its end an eye 63 into which is hooked the stubbleward end of a laterally extending lifting link 64, which has formed therein adjacent its opposite end an eye or loop 65, which is adapted to be hooked over the hooked end of a hook 66 fixed between a pair of strap members 67 pivoted at 68 to the runner shoe of the mower. Accordingly, when the operator on the seat of the tractor depresses the arm 58, the arms 56 and 57 are swung on their fulcrum 55 and pull on the link 64 to raise the cutter bar and frame member 35 of the mower to intermediate or plain lift position.

It should be remembered here that the frame member of the mower just mentioned is rockably fitted at its stubbleward end in the base plate 22. The position of the parts when raised to the position just described is shown in full lines in Fig. 4.

An efficient, though easily releasable, locking means has been provided for the lever so that the cutter bar may be retained in its lifted position. This means comprises, as shown particularly in Figs. 1, 5, 6, and 7, a concaved groove 69 in the upstanding arm 53 and a cooperating convexed bulge on the lever arm 56. Thus, as the main lever arm 58 is swung and the lever arms 56 and 57 move therewith, the convexed portion on the arm 56 will ride into the concaved portion 69 in the upstanding arm and lock the lever in this position. The arms 56 and 57 are so mounted on the pin 55 that sufficient play is permitted to allow for a slight lateral motion caused by this camming action, as clearly shown in Fig. 6. As shown, only one of the arms of the lever and one of the upstanding members of the base plate is provided with this cam locking means, as it has been found sufficient to adequately lock the lever and support the cutter bar in raised position.

A spring counter balancing means has also been provided to exert a force on the lever to assist the operator in raising the cutter bar. This means comprises a strong coil spring 70 fixed at one end by means of a link 71 to the U-shaped draft bar carried by the tractor and at its other end by means of a link 72 hooked into an eye member 73, which eye member is fastened to the lever arm 56. This eye member is provided with a crank handle and is rotatable in extensions 74 and 75 on said lever arm, whereby the tension of said spring may be varied through the medium of an adjusting screw 76, by rotation of the crank handle 77. The spring assists the operator in raising the cutter bar and also counter balances the weight of the same in lowering it.

For purposes of transport the operator must raise the cutter bar to the absolute vertical position. This is accomplished manually by the operator, who must get down out of his seat and pivot the cutter bar on the pins 37 and 38, heretofore mentioned, which automatically uncouples the loop 65 of link 64 from the hook member 66. The end of this link 64 beyond loop 65 is provided with a threaded portion and a winged nut 78. This winged nut may be unscrewed from the link and the link then engages in one of a number of apertures provided intermediate the ends of the cutter bar, the winged nut then being screwed over the protruding threaded portion of the link to positively retain the cutter bar in such raised position. It should be appreciated from this description that the link 64 performs a double function in that it acts as the pull link to raise the cutter bar to plain lift position and as a stay rod, or support, for the cutter bar in folded vertical position. The link 61 does not transmit the pull of the lever 58 to the frame and cutter bar when the cutter bar and frame are moved to plain lift position, but merely serves as a supporting link when the same has reached that position. It performs the same function when the cutter bar is in its folded vertical position.

It will thus be seen that there is herein provided apparatus in which the several objects of this invention are achieved and that the same is of simple construction, yet dependable in action, and is well adapted to meet the exacting conditions of hard practical use. As various possible embodiments might be made of the above invention, and, as various changes might be made in the embodiment set forth, it is to be understood that all matter herein set forth or shown in the accompanying drawings is to be interpreted as illustrative and not in a limiting sense.

What I claim is:

1. The combination with a tractor draft bar, of a mower attachment for said draft bar including a base member mounted on the draft bar, a coupling frame member rockably connected to the base member, a cutter bar carried by the coupling frame member, a lever fulcrumed on said base member, and means connecting the lever and cutter bar whereby the same may be adjusted to a raised position.

2. The combination with a tractor draft bar, of a mower attachment for said draft bar including a base member mounted on the draft bar, a coupling frame member rockably connected to the base member, a cutter bar carried by the coupling frame member, a lever fulcrumed on said base member, and a rigid link connecting the lever and cutter bar, whereby the same may be adjusted to a raised position.

3. The combination with a tractor draft bar, of a mower attachment for said draft bar including a base member carried by the draft bar, a coupling frame member rockably connected to the base member, a cutter bar carried by the coupling frame, a lever fulcrumed on the base member, means connecting the lever and cutter bar whereby the same may be raised, and means connected to the draft bar and the lever for exerting a force to assist in raising the cutter bar.

4. The combination with a tractor draft bar, of a mower attachment for said draft bar including a base member carried by the draft bar, a coupling frame member rockably connected to the base member, a cutter bar carried by the coupling frame, a lever fulcrumed on the base member, a link connecting the lever and cutter bar whereby the same may be raised, and resilient means connected to the draft bar and the lever for exerting a force to assist in raising the cutter bar.

5. The combination with a tractor draft bar, of a mower attachment for said draft bar including a base member carried on the draft bar, a coupling frame member rockably connected to the base member, a cutter bar carried by the coupling frame, a lever fulcrumed on the base member, a link connecting the lever and cutter bar whereby the same may be raised, a spring connected to the draft bar and the lever for exerting a force to assist in raising the cutter bar, and means for adjusting the tension of said spring.

6. The combination with a tractor draft bar, of a mower attachment for said draft bar including a base member carried on the draft bar, a coupling frame member rockably connected to the base member, a cutter bar carried by the coupling frame, a lever fulcrumed on the base member, a link connecting the lever and cutter bar whereby the same may be raised, a spring connected to the draft bar and the lever for exerting a force to assist in raising the cutter bar, and means including a crank carried by the lever for adjusting the tension of said spring.

7. The combination with a tractor draft bar, of a mower attachment for said draft bar including a base member carried on the draft bar, a coupling frame member rockably connected to the base member, a cutter bar carried by the coupling frame, a lever fulcrumed on said base member, means operable by said lever for raising the cutter bar, and means for releasably locking said lever to hold the cutter bar in raised position.

8. The combination with a tractor draft bar, of a mower adapted for attachment for said draft bar including a base member carried on the draft bar, a coupling frame member rockably carried by the base member, a cutter bar carried by the coupling frame member, a lever fulcrumed on said base member, a link operable by the lever for raising the cutter bar, and cam means for releasably locking said lever to hold the cutter bar in raised position.

9. The combination with a tractor draft bar, of a mower attachment for said draft bar including a base member carried by the draft bar, a coupling frame member rockably carried by the base member, a cutter bar carried by the coupling frame member, a lever fulcrumed on said base member, means operable by the lever for raising the cutter bar, and cooperating concave and convex portions on the base member and lever at its fulcrum for releasably locking the lever to hold the cutter bar in raised position.

10. The combination with a tractor draft bar, of a mower attachment for said draft bar including a base member carried by the draft bar, a coupling frame member rockable in the base member, a cutter bar carried by the coupling frame, a lever fulcrumed on said base member, means operable by said lever for raising the cutter bar, means for releasably locking said lever to hold the cutter bar in raised position, and means connected to the draft bar and the lever for exerting a force to assist in raising the cutter bar.

11. The combination with a tractor draft bar, of a mower attachment for said draft bar including a base member carried by the draft bar, a coupling frame member rockably carried by the base member, a cutter bar carried by the coupling frame member, a lever fulcrumed on said base member, a link operable by the lever for raising the cutter bar, cam means for releasably locking said lever to hold the cutter bar in raised position, and adjustable resilient means connected to the draft bar and the lever for exerting a force to assist in raising the cutter bar.

12. The combination with a tractor draft bar, of a mower attachment for said draft bar including a base member carried by the draft bar, a coupling frame member rockably connected to the base member, a cutter bar carried by the coupling frame member, a lever fulcrumed on the base member, and a plurality of members connecting the lever with the coupling frame member and cutter bar for moving the coupling frame member and cutter bar to a raised position.

13. The combination with a tractor draft bar, of a mower attachment for said draft bar including a base member carried by the draft bar, a coupling frame member rockably connected to the base member, a cutter bar carried by the coupling frame member, a lever fulcrumed on the base member, a link connecting the lever and coupling frame member, and a second link connecting the lever and cutter bar, whereby said coupling frame member and cutter bar may be moved as a unit to a raised position.

14. The combination with a tractor draft bar, of a mower attachment for said draft bar including a base member carried by the draft bar, a coupling frame member rockably connected to the base member, a cutter bar carried by the coupling frame member, a lever fulcrumed on the base member, a plurality of members connecting the lever with the coupling frame member and cutter bar for moving the coupling frame member and cutter bar to a raised position, and means for releasably locking said lever to hold said members in raised position.

15. The combination with a tractor draft bar, of a mower adapted for attachment for said draft bar including a base member carried by the draft bar, a coupling frame member rockably connected to the base member, a cutter bar carried by the coupling frame member, a lever fulcrumed on the base member, a link connecting the lever and coupling frame member, a second link connecting the lever and cutter bar, whereby said coupling frame member and cutter bar may be moved as a unit to a raised position, and cam means for releasably locking the lever to hold the coupling frame and bar members in raised position.

16. The combination with a tractor draft bar, of a mower attachment for said draft bar including a base member carried by the draft bar, a coupling frame member rockably connected to the base member, a cutter bar pivoted to the coupling frame member, a lever supported on the base member, and means connecting the lever and cutter bar for raising the same to plain lift position, the same means being adapted to support the cutter bar in absolute vertical lift position.

17. The combination with a tractor draft bar, of a mower attachment for said draft bar including a base member carried by the draft bar, a coupling frame member rockably connected to the base member, a cutter bar pivoted to the coupling frame member, a lever supported on the base member, and a link connecting the lever and cutter bar for raising the same to plain lift position, the same link being adapted to support the cutter bar in absolute vertical lift position.

18. The combination with a tractor draft bar, of a mower attachment for said draft bar including a base member carried by the draft bar, a coupling frame member rockably connected to the base member, a cutter bar pivoted to the coupling frame member, a lever supported on the base member, a link connecting the lever and cutter bar for raising the same to plain lift position, the same link being adapted to support the cutter bar in absolute vertical lift position, and means carried at the end of said link for locking the cutter bar in the latter position.

19. A mower comprising a frame, a cutter bar pivoted to the frame, a lever carried on the frame, and a link connecting the lever and frame, whereby the bar may be raised to plain lift position, said link being detachable from the frame to engage the bar at a point intermediate its ends to support the same in absolute vertical lift position.

20. A mower comprising a frame, a cutter bar pivoted to the frame, a lever carried on the frame, a link connecting the lever and frame whereby the bar may be raised to plain lift position, said link being detachable from the frame to engage the bar at a point intermediate its ends to support the same in absolute vertical lift position, and means carried at the end of the link for locking the bar in such position.

21. A mower comprising a frame, a cutter bar pivoted to the frame, a lever carried on the frame, a link connecting the lever and frame whereby the bar may be raised to plain lift position, said link being detachable from the frame to engage the bar at a point intermediate its ends to support the same in absolute vertical lift position, and a second link connecting the lever and frame for supporting the frame.

22. The combination with a tractor draft bar, of a mower attachment for said draft bar including a base member carried on the draft bar, a coupling frame member and cutter bar rockably supported on the base member, the base member including a pair of spaced upstanding arms, a pin journalled therein, an arched lever carried on the pin and straddling the arms, and means connecting the lever and cutter bar for raising the same.

23. The combination with a tractor draft bar, of a mower attachment for said draft bar including a base member carried on the draft bar, a coupling frame member and cutter bar rockably supported on the base member, the base member including a pair of spaced upstanding arms, a pin journalled therein, an arched lever carried on the pin and straddling the arms, an arm rigidly fixed to the arched lever for operating the same, and means connecting the arm and cutter bar for raising the same.

24. The combination with a tractor draft bar, of a mower attachment for said draft bar including a base member carried by the draft bar, a coupling frame member and cutter bar rockably supported on the base member, a base member including a pair of spaced upstanding arms, a pin journalled therein, a bifurcated lever carried on the pin and straddling the arms, one of said furcations and one of said arms having cooperating concave and convex portions for releasably locking the lever, and means operable by the lever for raising the cutter bar and frame.

25. The combination with a tractor draft bar, of a power take off drive supported on the draft bar, a mower comprising a frame and a cutter bar, pivotally attached to the draft bar and driven from said power take off drive, and a lever mounted on the draft bar for adjusting said mower frame and cutter bar.

26. The combination with a tractor draft bar, of a power take off drive supported on the draft bar, a mower comprising a frame and a cutter bar connected to said draft bar and driven from the power take off drive, and a lever mechanism mounted on the draft bar including link connections to the mower frame and cutter bar for adjusting said mower.

27. The combination with a tractor draft bar, of a power take off drive supported on the draft bar; a mower comprising a frame and a cutter bar pivotally attached to the draft bar and driven from said power take off drive, a lever on the draft bar connected to the mower frame and cutter bar for adjusting said mower, and a counter balancing spring connected to the lever and draft bar for assisting adjustment of the mower.

In testimony whereof I affix my signature.

CHARLES PEARSON.

on the pin and straddling the arms, one of said furcations and one of said arms having cooperating concave and convex portions for releasably locking the lever, and means operable by the lever for raising the cutter bar and frame.

25. The combination with a tractor draft bar, of a power take off drive supported on the draft bar, a mower comprising a frame and a cutter bar pivotally attached to the draft bar and driven from said power take off drive, and a lever mounted on the draft bar for adjusting said mower frame and cutter bar.

26. The combination with a tractor draft bar, of a power take off drive supported on the draft bar, a mower comprising a frame and a cutter bar connected to said draft bar and driven from the power take off drive, and a lever mechanism mounted on the draft bar including link connections to the mower frame and cutter bar for adjusting said mower.

27. The combination with a tractor draft bar, of a power take off drive supported on the draft bar, a mower comprising a frame and a cutter bar pivotally attached to the draft bar and driven from said power take off drive, a lever on the draft bar connected to the mower frame and cutter bar for adjusting said mower, and a counter balancing spring connected to the lever and draft bar for assisting adjustment of the mower.

In testimony whereof I affix my signature.

CHARLES PEARSON.

CERTIFICATE OF CORRECTION.

Patent No. 1,627,711.  Granted May 10, 1927, to

CHARLES PEARSON.

It is hereby certified that error appears in the printed specification of the above numbered patent requiring correction as follows: Page 4, line 62, claim 8, and page 5, line 21, claim 15, strike out the words "adapted for"; and that the said Letters Patent should be read with these corrections therein that the same may conform to the record of the case in the Patent Office.

Signed and sealed this 7th day of June, A. D. 1927.

Seal.

M. J. Moore,
Acting Commissioner of Patents.

CERTIFICATE OF CORRECTION.

Patent No. 1,627,711.                                                  Granted May 10, 1927, to

CHARLES PEARSON.

It is hereby certified that error appears in the printed specification of the above numbered patent requiring correction as follows: Page 4, line 62, claim 8, and page 5, line 21, claim 15, strike out the words "adapted for"; and that the said Letters Patent should be read with these corrections therein that the same may conform to the record of the case in the Patent Office.

Signed and sealed this 7th day of June, A. D. 1927.

Seal.                                                                              M. J. Moore,
                                                                            Acting Commissioner of Patents.